(12) United States Patent
Oshika et al.

(10) Patent No.: US 11,161,467 B2
(45) Date of Patent: Nov. 2, 2021

(54) INJECTION MOLDED ARTICLE

(71) Applicant: HONDA MOTOR CO., LTD., Tokyo (JP)

(72) Inventors: Hiroto Oshika, Tochigi-ken (JP); Tomohiko Kawamura, Tochigi-ken (JP); Osamu Ishikawa, Tochigi-ken (JP)

(73) Assignee: HONDA MOTOR CO., LTD., Tokyo (JP)

( * ) Notice: Subject to any disclaimer, the term of this patent is extended or adjusted under 35 U.S.C. 154(b) by 126 days.

(21) Appl. No.: 16/495,869

(22) PCT Filed: Mar. 26, 2018

(86) PCT No.: PCT/JP2018/011974
§ 371 (c)(1),
(2) Date: Sep. 20, 2019

(87) PCT Pub. No.: WO2018/181092
PCT Pub. Date: Oct. 4, 2018

(65) Prior Publication Data
US 2020/0010038 A1    Jan. 9, 2020

(30) Foreign Application Priority Data

Mar. 27, 2017    (JP) .............................. JP2017-060368

(51) Int. Cl.
*B60R 19/03*    (2006.01)
*B60R 19/02*    (2006.01)
(Continued)

(52) U.S. Cl.
CPC ........ *B60R 19/023* (2013.01); *B29C 45/0017* (2013.01); *B60R 19/03* (2013.01); *B60R 19/24* (2013.01); *B29L 2031/3044* (2013.01)

(58) Field of Classification Search
CPC ....... B60R 19/023; B60R 19/03; B60R 19/24; B29C 45/0017; B29L 2031/3044
See application file for complete search history.

(56) References Cited

U.S. PATENT DOCUMENTS 7,461,875 B2 * 12/2008 Kobayashi .......... B29C 45/0081
293/115
2007/0222238 A1    9/2007 Kobayashi et al.

FOREIGN PATENT DOCUMENTS

JP    3721185    11/2005

OTHER PUBLICATIONS

International Search Report and Written Opinion for International Application No. PCT/JP2018/011974 dated Jun. 26, 2018, 7 pages.

* cited by examiner

*Primary Examiner* — D Glenn Dayoan
*Assistant Examiner* — Melissa Ann Bonifazi
(74) *Attorney, Agent, or Firm* — Amin, Turocy & Watson, LLP

(57) ABSTRACT

This injection molded article has a body part and a movable part. The body part has a first stopper part and a second stopper part, while the movable part has a movable body and a first rib and a second rib that are formed to protrude at both widthwise end parts of the movable body. A first groove and a second groove that extend in the depth direction perpendicular to the axial direction of a hinge part, are respectively formed between the movable body and the first rib and between the movable body and the second rib.

5 Claims, 4 Drawing Sheets

(51) Int. Cl.
*B29C 45/00* (2006.01)
*B60R 19/24* (2006.01)
*B29L 31/30* (2006.01)

INJECTION MOLDED ARTICLE

TECHNICAL FIELD

The present invention relates to an injection molded article, and, more specifically, relates to an injection molded article having: a main body section; and a movable section coupled, via a hinge section, to said main body section.

BACKGROUND ART

A resin-made bumper configuring an automobile vehicle body is manufactured by, for example, performing injection molding using a molten resin. This kind of resin-made bumper is configured by integrally providing: a bumper main body; and a clip holding section for holding a clip for attaching a bumper grill.

Now, during injection molding, if the resin-made bumper is molded assuming the clip holding section to be in a horizontal attitude taken when attaching the bumper grill, the clip holding section becomes an undercut section, and mold opening becomes difficult. In order to avoid such a shortcoming, as shown particularly in FIGS. 3 and 4 of Japanese Patent No. 3721185, a configuration is adopted whereby the resin-made bumper is molded assuming the clip holding section to be in an upright attitude and coupled, via a hinge section, to the bumper main body.

Then, after mold opening has been performed, the clip holding section is revolved with the hinge section as its center of revolution, and a pair of ribs formed in said clip holding section are stopped in an engaged manner by a pair of stopper sections provided in the bumper main body. The clip holding section is hindered from returning to the upright attitude by this engagement, and said clip holding section has its position fixed in a state of the horizontal attitude.

More specifically, when the clip holding section is revolved in the above-described way, said clip holding section passes between the pair of stopper sections. A width of the clip holding section is set larger compared to a clearance between the stopper sections, hence, during this passage, the clip holding section bends (specifically, the ribs thereof bend). After passage, the clip holding section attempts to return to its original position (the upright attitude) by elastic action, but due to the ribs being stopped in the stopper sections, further return of the clip holding section is hindered.

SUMMARY OF INVENTION

As described above, in order to pass the clip holding section between the pair of stopper sections, said clip holding section (specifically, the ribs thereof) must be bent. In other words, if it is difficult for the clip holding section to bend, then a long time is required for passing said clip holding section between the pair of stopper sections. In this case, it becomes difficult to efficiently obtain the resin-made bumper as a final product in which the clip holding section has been passed between the pair of stopper sections.

A general object of the present invention is to provide an injection molded article having an easily bending movable section.

A main object of the present invention is to provide an injection molded article that enables a final product to be efficiently obtained by changing an attitude of a movable section after injection molding.

Solution To Problem

Due to an embodiment of the present invention, there is provided an injection molded article having: a main body section; and a movable section coupled, via a hinge section, to the main body section, the main body section having a first stopper section and a second stopper section, the movable section having: a movable main body; and a first rib and a second rib that are formed in a projecting manner in both end sections in a width direction along an axis direction of the hinge section, of the movable main body and that, after the movable section has passed between the first stopper section and the second stopper section due to the movable section revolving about the hinge section, are respectively stopped in an engaged manner by the first stopper section and the second stopper section, and a first groove and a second groove that extend along a depth direction orthogonal to the axis direction of the hinge section being respectively formed between the movable main body and the first rib and between the movable main body and the second rib.

A width direction dimension of the movable section is smaller compared to a clearance between the first stopper section and the second stopper section. However, since the first groove and the second groove are formed between the movable main body and the first rib and between the movable main body and the second rib, it becomes easy for the first rib and the second rib to bend with the first groove and the second groove becoming pivots. Therefore, when the first rib and the second rib abut on the first stopper section and the second stopper section due to the movable section revolving, these first rib and second rib easily bend to a rearward side of abutting places.

Consequently, the movable section can easily pass through an opening formed between the first stopper section and the second stopper section. After passage, when the movable section attempts to return to its original upright attitude by elastic action, the first stopper section and the second stopper section respectively stop the first rib and the second rib in an engaged manner. As a result, the movable section is hindered from returning to its original upright attitude and has its position fixed in a horizontal attitude.

Thus, in the present invention, it becomes easy for the movable section to pass between the first stopper section and the second stopper section due to it being easy to bend. It is therefore possible for an attitude of the movable section to be efficiently changed in a short time, even in such a case as when a space after the movable section has been passed between the first stopper section and the second stopper section is narrow. Hence, a final product in which the movable section has had its position fixed in the horizontal attitude between the first stopper section and the second stopper section can be efficiently obtained. That is, an improvement in production efficiency of the injection molded article can be achieved.

It is preferable that corners of regions abutting on each of the first rib and the second rib, of the first stopper section and the second stopper section have an arc shape, and that corners of regions abutting on each of the first stopper section and the second stopper section, of the first rib and the second rib, have an arc shape. In this case, it is avoided that stress locally concentrates in each of the corners. Hence, it is avoided that the corners chip.

In addition, it is preferable that the first groove and the second groove are formed in a passing direction front surface that passes earlier when the movable section passes between the first stopper section and the second stopper section, and that inner walls of the first groove and the second groove curve in an arc shape. In this case, the first rib and the second rib bend even more easily. Moreover, since it is avoided that stress locally concentrates in bottom surfaces of the first groove and the second groove, it can be avoided that a crack starts from the first groove and the second groove.

It is preferable that the movable main body of the movable section is thicker compared to the first rib and the second rib. In this case, it becomes even easier for the first rib and the second rib to bend. Note that in order to provide a thickness difference, a configuration should be adopted providing level difference sections between the movable main body and the first rib and between the movable main body and the second rib in a passing direction rear surface that passes later than the passing direction front surface does when the movable section passes between the first rib and the second rib, of the movable section. The movable main body and the first rib and the second rib are partitioned by this level difference section.

It is preferable that the level difference sections are positioned on back surfaces of central portions of bottom sections of the first groove and the second groove. Furthermore, angles of the level difference sections are preferably substantially 90°. As a result, a certain degree of rigidity is secured in the first rib and the second rib, so it can be avoided that the first rib or the second rib is damaged.

Yet further, it is preferable that a clearance between the first stopper section and the second stopper section is larger compared to a clearance between the first groove and the second groove. In this case, the first groove and the second groove are positioned on an inside of the opening formed between the first stopper section and the second stopper section. Therefore, when the passing direction front surfaces of the first rib and the second rib abut on the first stopper section and the second stopper section, the first rib and the second rib can easily bend with the first groove and the second groove as pivots.

Due to the present invention, a configuration is adopted whereby the movable section coupled to the main body section via the hinge section includes: a movable main body; and a first rib and a second rib that are formed in a projecting manner in both end sections in the width direction of said movable main body, and a configuration is adopted whereby the first groove and the second groove that extend along a depth direction orthogonal to the axis direction of the hinge section are respectively formed between the movable main body and the first rib and between the movable main body and the second rib. The width direction dimension of the movable section is set smaller compared to the clearance between the first stopper section and the second stopper section, but since the first groove and the second groove are formed, it is easy for the first rib and the second rib to bend with these first groove and second groove as pivots.

As a result, it becomes easy for the movable section to be passed between the first stopper section and the second stopper section by revolving said movable section. That is, the attitude of the movable section can be efficiently changed in a short time.

Hence, the final product in which the movable section has had its position fixed in the horizontal attitude between the first stopper section and the second stopper section can be efficiently obtained. As a result, production efficiency of the injection molded article improves.

DESCRIPTION OF EMBODIMENTS

A preferred embodiment of an injection molded article according to the present invention will be presented and described in detail below with reference to the accompanying drawings.

Figure 1:
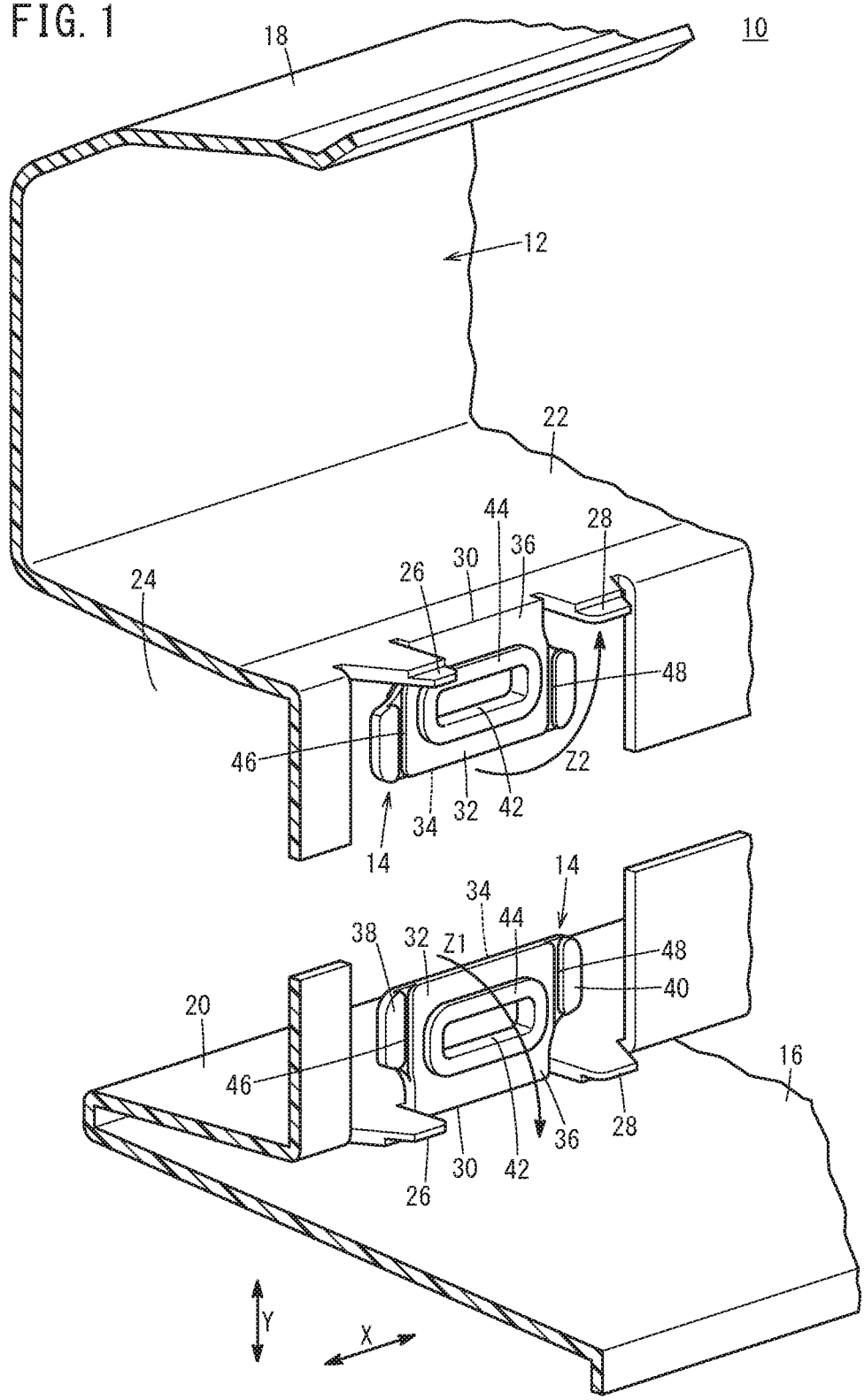
FIG. 1 is a principal part schematic perspective cross-sectional view of an injection molded article (a vehicular bumper) according to an embodiment of the present invention.

FIG. 1 is a principal part schematic perspective cross-sectional view of a vehicular bumper 10 as the injection molded article according to the present embodiment. This vehicular bumper 10 is a single member that integrally includes a bumper main body 12 (a main body section) and a clip holding section 14 (a movable section), and is configured from a resin-made injection molded article.

As shown schematically in FIG. 1, the bumper main body 12 has a lower wall section 16 and an upper wall section 18, and is provided with a lower opening peripheral edge wall section 20 and an upper opening peripheral edge wall section 22 in such a manner that the lower opening peripheral edge wall section 20 and the upper opening peripheral edge wall section 22 extend substantially in a horizontal direction doubled back from a vehicle body frontward side to a vehicle body rearward side of the lower wall section 16 and the upper wall section 18. An attachment opening 24 for attaching a lower grill via a clip (neither of which are illustrated) is formed by the lower opening peripheral edge wall section 20 and the upper opening peripheral edge wall section 22. A plurality of the clip holding sections 14 are regions where the clip is held and are provided in each of the lower opening peripheral edge wall section 20 and the upper opening peripheral edge wall section 22 located deep inside the attachment opening 24.

Note that FIG. 1 shows the vehicular bumper 10 immediately after injection molding, and that at this time point, each of the clip holding sections 14 has an attitude extending in a direction substantially orthogonal to an extension direction of the lower opening peripheral edge wall section 20 and the upper opening peripheral edge wall section 22. That is, the clip holding section 14 has an upright attitude extending substantially vertically upwardly in the lower opening peripheral edge wall section 20, and extending substantially vertically downwardly in the upper opening peripheral edge wall section 22.

Figure 2:
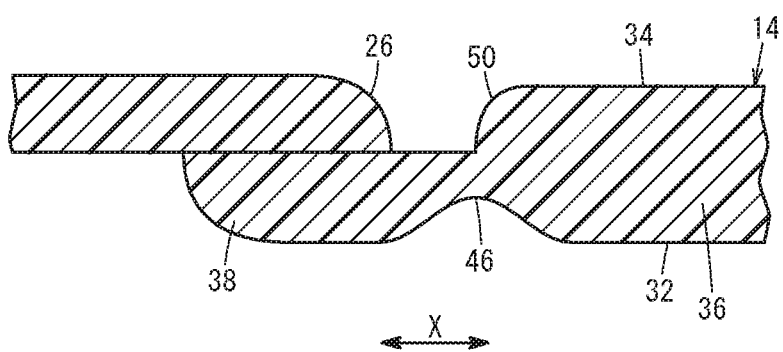
FIG. 2 is a principal part thickness direction cross-sectional view showing a first rib and a first stopper section when a movable section (a clip holding section) shown in FIG. 1 has had its position fixed in a horizontal attitude.
Figure 3:
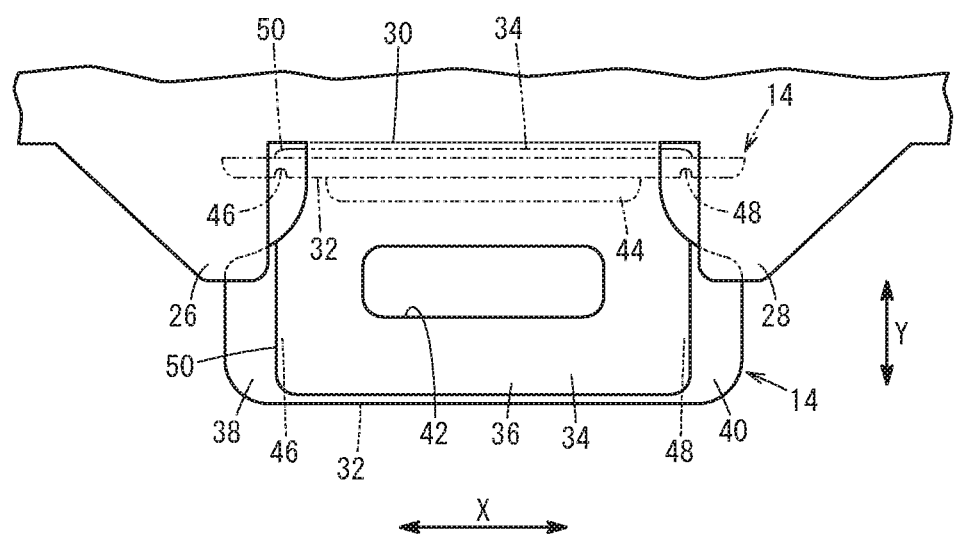
FIG. 3 is a principal part schematic plan view of when the clip holding section has had its position fixed in the horizontal attitude.
Figure 4:
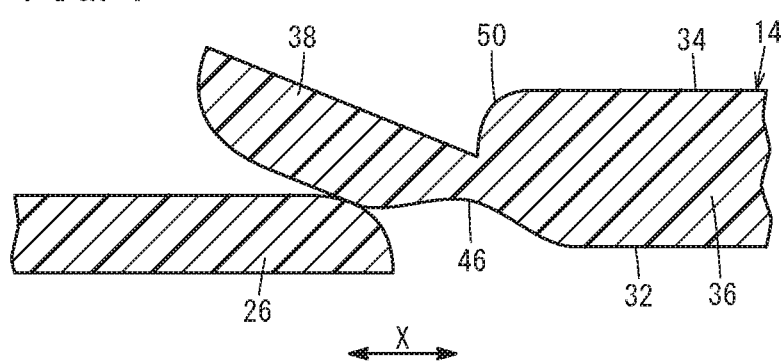
FIG. 4 is a principal part thickness direction cross-sectional view showing the first rib and the first stopper section when the clip holding section passes between the first stopper section and a second stopper section.

As shown in detail in FIGS. 2-4, a first stopper section 26 and a second stopper section 28 are formed in a projecting manner in the lower opening peripheral edge wall section 20. The first stopper section 26 and the second stopper section 28 have a substantially trapezoidal shape with a bumper main body 12 (a lower opening peripheral edge wall section 20) side being a long side and a clip holding section 14 side being a short side.

The clip holding section 14 is arranged between these first stopper section 26 and second stopper section 28, and is coupled to the bumper main body 12 via a hinge section 30 which is thin. Hereafter, an axis direction of the hinge section 30 (an arrow X direction) will also be referred to as a width direction of the clip holding section 14. Moreover, a direction orthogonal to the width direction (an arrow Y direction) will be defined as a depth direction of the clip holding section 14.

The hinge section 30 is thinner, hence has comparatively lower rigidity compared to another region. Therefore, the clip holding section 14 easily revolves in an arrow Z1 direction, with the hinge section 30 as its center of revolution (about the hinge section 30). At a time of this revolution, the clip holding section 14 passes between the first stopper section 26 and the second stopper section 28. Hereafter, an end surface that passes earlier between the first stopper section 26 and the second stopper section 28 will be written as a passing direction front surface, an end surface that passes later between the first stopper section 26 and the second stopper section 28 will be written as a passing direction rear surface, and these will be respectively assigned with reference symbols 32 and 34. Moreover, a thickness direction of the clip holding section 14 describes a direction directed from the passing direction front surface 32 to the passing direction rear surface 34 (or a reverse direction to that direction).

The clip holding section 14 has: a movable main body 36; and a first rib 38 and a second rib 40 that are respectively provided to both end sections in the width direction of said movable main body 36 and are thinner compared to the movable main body 36. A distance from the first rib 38 to the second rib 40, in other words, a width direction dimension of the clip holding section 14 is set slightly larger than a clearance between the first stopper section 26 and the second stopper section 28.

A holding hole 42 extending along the width direction is formed in a penetrating manner in the movable main body 36. The clip is held in the movable main body 36 by being inserted in this holding hole 42. An opening peripheral edge on a passing direction front surface 32 side of the holding hole 42 has formed therein a boss 44 that circuits said opening peripheral edge.

In the passing direction front surface 32, a first groove 46 and a second groove 48 extending along the depth direction are formed so as to sink toward a passing direction rear surface 34 side. The first groove 46 is positioned between the first rib 38 and the movable main body 36, and the second groove 48 is positioned between the movable main body 36 and the second rib 40. As may be understood from FIG. 2 which enlarges a thickness direction cross section on a side of the first rib 38 and the first groove 46, the first groove 46 is formed as an arc-shaped groove whose cross section has substantially a semicircular shape. Note that FIG. 2 shows a state where the clip holding section 14 has passed between the first stopper section 26 and the second stopper section 28, and, moreover, the first rib 38 has been stopped in an engaged manner by the first stopper section 26.

As shown in FIG. 2, the first rib 38 is substantially flush with the movable main body 36 (a region where the boss 44 is not formed) in the passing direction front surface 32. On the other hand, in the passing direction rear surface 34, a level difference section 50 based on a thickness difference between the movable main body 36 and the first rib 38 is formed between the first rib 38 and the movable main body 36. The first rib 38 and the movable main body 36 are partitioned by this level difference section 50. Note that in this case, an angle of the level difference section 50 is substantially 90°, and the level difference section 50 is positioned on a back surface of a central portion of a bottom section of the first groove 46.

A second groove 48 and second rib 40 side is also formed similarly to the first groove 46 and first rib 38 side, hence, detailed illustration and description thereof will be omitted.

The clearance between the first stopper section 26 and the second stopper section 28 is set larger compared to a clearance between the first groove 46 and the second groove 48. Therefore, as shown in FIG. 2, the first groove 46 and the second groove 48 are positioned on an inside of an opening formed by the first stopper section 26 and the second stopper section 28. Moreover, as shown in FIG. 3 which is a plan view of the clip holding section 14 that has had its position fixed by passing between the first stopper section 26 and the second stopper section 28, the level difference sections 50 are exposed between the first stopper section 26 and the second stopper section 28.

As shown in FIG. 4, in the first stopper section 26 and the second stopper section 28, an end section on the short side is a stopper section side overlapping region (an abutting region) that overlaps (abuts on) an end section on a bumper main body 12 side of the first rib 38 and the second rib 40. In this stopper section side overlapping region, a corner is rounded to have a shape curved in an arc-like manner. A corner of the end section on the bumper main body 12 side of the first rib 38 and the second rib 40 (a rib side overlapping region) also similarly has an arc shape (fillet).

Although illustration and description thereof will be omitted, the clip holding section 14 formed in the upper opening peripheral edge wall section 22 is also similarly formed. However, the clip holding section 14 formed in the upper opening peripheral edge wall section 22 is revolved from an upper wall section 18 (a vehicle body upper) side toward the upper opening peripheral edge wall section 22 (a lower side). Therefore, when position fixing is performed, the first stopper section 26 and the second stopper section 28 are positioned above the first rib 38 and the second rib 40.

The vehicular bumper 10 according to the present embodiment basically configured as above will next have its operational advantages described.

The vehicular bumper 10 is manufactured by injection molding using a molten resin. At this time, if the clip holding section 14 is formed parallel to the extension direction of the lower opening peripheral edge wall section 20 and the upper opening peripheral edge wall section 22, then since the clip holding section 14 becomes an undercut section, it becomes difficult for mold opening to be performed. In order to avoid this, the clip holding section 14 is formed as so as to be substantially orthogonal to the extension direction of the lower opening peripheral edge wall section 20 and the upper opening peripheral edge wall section 22, that is, in an upright attitude, as shown in FIG. 1.

Mold opening is performed to remove the vehicular bumper 10 from a cavity, and then, in order to set in a horizontal attitude each of the clip holding sections 14 provided in the lower opening peripheral edge wall section 20 and the upper opening peripheral edge wall section 22, an operator revolves each of the clip holding sections 14 with the hinge section 30 as their center of revolution. In the lower opening peripheral edge wall section 20, a revolution direction is the arrow Z1 direction. In this process, the clip holding section 14 passes between the first stopper section 26 and the second stopper section 28.

Specifically, in the lower opening peripheral edge wall section 20, the passing direction front surface 32 of the rib side overlapping region of the first rib 38 abuts on an upper surface of the stopper section side overlapping region of the first stopper section 26, and the passing direction front surface 32 of the rib side overlapping region of the second rib 40 abuts on an upper surface of the stopper section side overlapping region of the second stopper section 28.

Now, the first rib 38 and the second rib 40 are thinner compared to the movable main body 36, and the first groove 46 and the second groove 48 whose inner walls are curved are respectively formed between the movable main body 36 and first rib 38 and the movable main body 36 and second rib 40. Moreover, since the clearance between the first groove 46 and the second groove 48 is shorter compared to the clearance between the first stopper section 26 and the second stopper section 28, the first groove 46 and the second groove 48 are positioned on the inside of the opening from the first stopper section 26 to the second stopper section 28, and the level difference sections 50 at substantially 90° are positioned on the back surfaces (the passing direction rear surface) of central portions of the bottom section of the first groove 46 and the second groove 48.

For the above kinds of reasons, when the clip holding section 14 is further revolved, the first rib 38 and the second rib 40 easily bend toward the passing direction rear surface 34 side as shown in FIG. 4. Hence, the clip holding section 14 easily passes between the first stopper section 26 and the second stopper section 28. Note that since the level difference sections 50 are provided on the back surfaces (the passing direction rear surface) of the central portions of the bottom sections of the first groove 46 and the second groove 48, a certain degree of rigidity is given to the first rib 38 and the second rib 40. Hence, it is avoided that the first rib 38 and the second rib 40 are damaged.

Moreover, corners of both the rib side overlapping region of the first rib 38 and second rib 40 and the stopper section side overlapping region of the first stopper section 26 and second stopper section 28, have an arc shape (fillet). Therefore, it is avoided that localized stress acts on the corners, or that, as a result, the corners chip, and so on.

The clip holding section 14 is then further revolved toward the lower wall section 16 of the vehicular bumper 10. Then, when the operator releases the clip holding section 14, the clip holding section 14 revolves, due to its elasticity action, with the hinge section 30 as its center of revolution, and attempts to return to its original upright attitude. Moreover, at a time point when a depth direction has become substantially parallel to the extension direction of the lower opening peripheral edge wall section 20, as shown in FIGS. 2 and 3, the passing direction rear surface 34 of the rib side overlapping region of the first rib 38 abuts on a lower surface of the stopper section side overlapping region of the first stopper section 26, and the passing direction rear surface 34 of the rib side overlapping region of the second rib 40 abuts on a lower surface of the stopper section side overlapping region of the second stopper section 28.

That is, the first stopper section 26 and the second stopper section 28 respectively stop the first rib 38 and the second rib 40 in an engaged manner. Due to this engagement, further revolution (a return to the upright attitude) of the clip holding section 14 is hindered. As a result, the clip holding section 14 has its position fixed in the horizontal attitude.

Thus, in the present embodiment, the first rib 38 and the second rib 40 provided in end sections in the width direction of the clip holding section 14 easily bend. It hence becomes easy for the clip holding section 14 to be passed between the first stopper section 26 and the second stopper section 28. Therefore, even in such a case as when, for example, a space between the lower opening peripheral edge wall section 20 and the lower wall section 16 of the vehicular bumper 10 is narrow, the attitude of the clip holding section 14 can be efficiently changed in a short time. As a result, production efficiency of the vehicular bumper 10 as a final product in which the clip holding section 14 has passed between the first stopper section 26 and the second stopper section 28 and has had its position fixed as the horizontal attitude, can be improved.

As described above, the level difference sections 50 have their angles set to substantially 90°, and are positioned on the back surfaces (the passing direction rear surface) of the central portions of the bottom sections of the first groove 46 and the second groove 48. By setting positions of the level difference sections 50 in this way, pivots when the first rib 38 and the second rib 40 bend substantially coincide in a plurality of the vehicular bumpers 10. That is, so-called work individual difference can be reduced. Moreover, combined with cross sections of the first groove 46 and the second groove 48 having an arc shape, it can be made easy for the first rib 38 and the second rib 40 to be bent to a side of the passing direction rear surface 34 where the level difference sections 50 are provided, and it can be made easy for the first rib 38 and the second rib 40 to return to their original position (their original attitude) to a side of the passing direction front surface 32 where the first groove 46 and the second groove 48 are formed.

Although detailed description thereof will be omitted, in the upper opening peripheral edge wall section 22, the clip holding section 14 is revolved toward the upper wall section 18 along an arrow Z2 direction. At this time, the passing direction front surface 32 of the rib side overlapping region of the first rib 38 abuts on the lower surface of the stopper section side overlapping region of the first stopper section 26, and the passing direction front surface 32 of the rib side overlapping region of the second rib 40 abuts on the lower surface of the stopper section side overlapping region of the second stopper section 28.

Then, further revolution is performed similarly to as described above, whereby the passing direction rear surface 34 of the rib side overlapping region of the first rib 38 abuts on the upper surface of the stopper section side overlapping region of the first stopper section 26, and the passing direction rear surface 34 of the rib side overlapping region of the second rib 40 abuts on the upper surface of the stopper section side overlapping region of the second stopper section 28. As a result, the first rib 38 and the second rib 40 are stopped in an engaged manner, and further revolution (a return to the upright attitude) of the clip holding section 14 is hindered, whereby said clip holding section 14 has its position fixed in the horizontal attitude.

Then, the clip for attaching the lower grill is held in the holding hole 42 of each of the clip holding sections 14.

The present invention is not specifically limited to the above-described embodiment, and may be variously modified in a range not departing from the spirit of the present invention.

For example, the injection molded article need only have: a main body section; and a movable section coupled to said main body section via the hinge section 30, and is not specifically limited to the vehicular bumper 10.

DESCRIPTION OF SYMBOLS

10 . . . vehicular bumper
12 . . . bumper main body

14 ... clip holding section
26 ... first stopper section
28 ... second stopper section
30 ... hinge section
32 ... passing direction front surface
34 ... passing direction rear surface
36 ... movable main body
38 ... first rib
40 ... second rib
46 ... first groove
48 ... second groove
50 ... level difference section

What is claim is:

1. An injection molded article comprising:
a main body section; and
a movable section coupled, via a hinge section, to the main body section, the main body section comprising a first stopper section and a second stopper section, the movable section comprising:
   a movable main body,
   a first rib and a second rib that are formed in a projecting manner in both end sections in a width direction along an axis direction of the hinge section, of the movable main body and that, after the movable section has passed between the first stopper section and the second stopper section due to the movable section revolving about the hinge section, are respectively stopped in an engaged manner by the first stopper section and the second stopper section, and
a first groove and a second groove that extend along a depth direction orthogonal to the axis direction of the hinge section being respectively formed between the movable main body and the first rib and between the movable main body and the second rib, wherein corners of regions abutting on each of the first rib and the second rib, of the first stopper section and the second stopper section have an arc shape, and corners of regions abutting on each of the first stopper section and the second stopper section, of the first rib and the second rib have an arc shape, wherein the first groove and the second groove are formed in a passing direction front surface that passes earlier when the movable section passes between the first stopper section and the second stopper section, and wherein inner walls of the first groove and the second groove curve in an arc shape.

2. The injection molded article according to claim 1, wherein the movable main body of the movable section is thicker compared to the first rib and the second rib, wherein the movable main body and the first rib and the second rib are partitioned by level difference sections formed between the movable main body and the first rib and between the movable main body and the second rib in a passing direction rear surface that passes later than the passing direction front surface does when the movable section passes between the first rib and the second rib, of the movable section, and wherein the level difference sections are positioned on back surfaces of central portions of bottom sections of the first groove and the second groove.

3. The injection molded article according to claim 2, wherein an angle of each of the level difference sections is substantially 90°.

4. The injection molded article according to claim 1, wherein a clearance between the first stopper section and the second stopper section is larger compared to a clearance between the first groove and the second groove.

5. The injection molded article according to claim 1, wherein the injection molded article is a vehicular bumper comprising the main body section as a bumper main body and the movable section as a clip holding section.

* * * * *